(12) United States Patent
Agrawal et al.

(10) Patent No.: US 11,790,242 B2
(45) Date of Patent: Oct. 17, 2023

(54) MINI-MACHINE LEARNING

(71) Applicant: Oracle International Corporation, Redwood Shores, CA (US)

(72) Inventors: Sandeep Agrawal, San Jose, CA (US); Venkatanathan Varadarajan, Seattle, WA (US); Sam Idicula, Santa Clara, CA (US); Nipun Agarwal, Saratoga, CA (US)

(73) Assignee: Oracle International Corporation, Redwood Shores, CA (US)

( * ) Notice: Subject to any disclaimer, the term of this patent is extended or adjusted under 35 U.S.C. 154(b) by 800 days.

(21) Appl. No.: 16/166,039

(22) Filed: Oct. 19, 2018

(65) Prior Publication Data

US 2020/0125961 A1 Apr. 23, 2020

(51) Int. Cl.
*G06N 3/126* (2023.01)
*G06N 20/00* (2019.01)

(52) U.S. Cl.
CPC .............. *G06N 3/126* (2013.01); *G06N 20/00* (2019.01)

(58) Field of Classification Search
CPC ........ G06N 20/00; G06N 20/10; G06N 20/20; G06N 3/126
See application file for complete search history.

(56) References Cited

U.S. PATENT DOCUMENTS

| | | |
|---|---|---|
| 2002/0169735 A1 | 11/2002 | Kil et al. |
| 2017/0061329 A1 * | 3/2017 | Kobayashi ............. G06N 20/00 |
| 2018/0022539 A1 | 1/2018 | Vedani |

(Continued)

OTHER PUBLICATIONS

Marculescu et al., "Hardware-Aware Machine Learning: Modeling and Optimization", Arxiv.org, dated Sep. 14, 2018, 8 pages.

(Continued)

*Primary Examiner* — Li B. Zhen
*Assistant Examiner* — William Wai Yin Kwan
(74) *Attorney, Agent, or Firm* — Hickman Becker Bingham Ledesma LLP (57) ABSTRACT

Techniques are described for generating and applying mini-machine learning variants of machine learning algorithms to save computational resources in tuning and selection of machine learning algorithms. In an embodiment, at least one of the hyper-parameter values for a reference variant is modified to a new hyper-parameter value thereby generating a new variant of machine learning algorithm from the reference variant of machine learning algorithm. A performance score is determined for the new variant of machine learning algorithm using a training dataset, the performance score representing the accuracy of the new machine learning model for the training dataset. By performing training of the new variant of machine learning algorithm with the training data set, a cost metric of the new variant of machine learning algorithm is measured by measuring usage the used computing resources for the training. Based on the cost metric of the new variant of machine learning algorithm and comparing the performance score for the new and reference variants, the system determines whether the modified reference machine algorithm is the mini-machine learning algorithm that is computationally less costly than the reference variant of machine learning algorithm but closely tracks the accuracy thereof.

22 Claims, 6 Drawing Sheets

(56) References Cited

U.S. PATENT DOCUMENTS

| | | | |
|---|---|---|---|
| 2018/0046926 | A1 | 2/2018 | Achin et al. |
| 2018/0225391 | A1 | 8/2018 | Sali et al. |
| 2019/0042887 | A1* | 2/2019 | Nguyen .............. G06N 20/00 |
| 2019/0095756 | A1 | 3/2019 | Agrawal et al. |
| 2019/0392255 | A1 | 12/2019 | Franklin |
| 2020/0082013 | A1 | 3/2020 | Triplet et al. |
| 2020/0334569 | A1 | 10/2020 | Moghadam |
| 2021/0390466 | A1 | 12/2021 | Varadarajan et al. |
| 2022/0121955 | A1 | 4/2022 | Chavoshi et al. |

OTHER PUBLICATIONS

Koehrsen, Will, "Automated Machine Learning Hyperparameter Tuning in Python", dated Jul. 3, 2018, 21 pages.

Xin, Guo "A New Approach Towards the Combined Algorithm Selection and Hyper-parameter Optimization Problem", dated Jan. 28, 2019, 57 pages.

Lin et al., "Experiencing SAX: a novel symbolic representation of time series", dated Apr. 3, 2007, 38 pages.

Abe et al., "Developing an Integrated Time-Series Data Mining Environment for Medical Data Mining", Seventh IEEE International Conference on Data Mining—Workshops, dated 2007, 6 pages.

Ahmed et al., "An Empirical Comparison of Machine Learning Models for Time Series Forecasting", dated Sep. 15, 2010, 31 pages.

Amazon SageMaker, "DeepAR Forecasting Algorithm", https://docs.aws.amazon.com/sagemaker/latest/dg/deepar.html,last viewed on Jun. 29, 2020, 5 pages.

Artificial Intelligence Blog, "Announcing automated ML capability in Azure Machine Learning", dated Sep. 24, 2018, 8 pages.

Brownlee, Jason, "Time Series Forecasting as Supervised Learning", dated Aug. 21, 2019, 2 pages.

Camerra et al., "Beyond one billion time series: indexing and mining very large time series collections with iSAX2+", dated Feb. 16, 2013, 29 pages.

"Machine Learning Approaches for Time Series Data" dated May 19, 2019, 25 pages.

Kraska, Tim, "Northstar: An Interactive Data Science System", Proceedings of the VLDB Endowment, vol. 11, No. 12 Copyright 2018 VLDB Endowment, 15 pages.

Wang et al., "Experimental comparison of representation methods and distance measures for time series data", dated Feb. 12, 2010, 35 pages.

Ng, "Data preprocessing for machine learning: options and recommendations", dated Jun. 22, 2020, 12 pages.

Olson et al., "Evaluation of a Tree-based Pipeline Optimization Tool for Automating Data Science", dated Mar. 20, 2016, 8 pages.

Oracle, "The Oracle AutoML Pipeline" Four Main Stages, https://docs.cloud.oracle.com/en-us/iaas/tools/ads-sdk/latest/user_guide/automl/overview.html, dated Apr. 28, 2020 or later, 4 pages.

Paoli et al., "Forecasting of preprocessed daily solar radiation time series using neural networks", Solar Energy, Elsevier, dated 2010, 43 pages.

Plotz et al., "Feature Learning for Activity Recognition in Ubiquitous Computing", dated Jan. 2011, 7 pages.

Schoenfeld et al., "Preprocessor Selection for Machine Learning Pipelines", dated 2018, 7 pages.

Song et al., "Deep r -th Root of Rank Supervised Joint Binary Embedding for Multivariate Time Series Retrieval", KDD 2018, dated Aug. 19-23, 2018, London, United Kingdom, 10 pages.

Faloutsos et al., "Fast Subsequence Matching in Time Series Databases", dated 1998, 11 pages.

Bhide, Manish, "Understanding Model Drift with IBM Watson OpenScale", Medium, Trusted AI, available: https://medium.com/trusted-ai/understanding-model-drift-with-ibm-watson-openscale-4c5401aa8da4, Nov. 4, 2019.

Malkomes, Gustavo, et al.,"Bayesian optimization for automated model selection", NIPS 2016, (https://proceedings.neurips.cc/paper/2016/file/3bbfdde8842a5c44a0323518eec97cbe-Paper.pdf) Dec. 2016, 9 pages.

Moghagam, U.S. Appl. No. 16/388,830, filed Apr. 18, 2019, Non-Final Rejection, dated Oct. 7, 2022.

Wistuba et al., "Scalable Gaussian process-based transfer surrogates for hyperparameter optimization", Machine Learning, 107(1), 2017, 36 pages.

Wistuba et al., "Learning Hyperparameter Optimization Initializations", IEEE, 2015, 10 pages.

Feurer et al., "Scalable Meta-Learning for Bayesian Optimization", Feb. 6, 2018, 10 pages.

Cohen et al., "Online Row Sampling", Apr. 20, 2016, 20 pages.

Kotthoff et al.,"Auto-WEKA: Automatic Model Selection and Hyperparmeter Optimization in WEKA", Ch. 4, Automated Machine Learning Methods, Sys, Challenges, https://doi.org/10.1007/978-3-030-05318-5_4, pp. 81-95, May 18, 2019, 15pgs.

Komer et al., "Hyperopt-Sklearn", Automated Machine Learning Methods, Systems, Challenges, https://doi.org/10.1007/978-3-030-05318-5_5, pp. 97-111, May 18, 2019, 15pgs.

Falguni N, Patel, et al., "A Review on Data Partition Method with Feature Selection Method for Big Data", 3rd Intl Conf on New Horizons in Science, Engineering and Mgmt and Humanities, Isbn: 978-93-87793-31-6, Apr 2019, 10pgs.

Cuesta, Aitor Palacios, "Hyperparameter Optimization for Large-scale Machine Learning", Master Thesis, Tech Univ of Berlin, Doi: 10.13140/Rg.2.2.33876.65927, Oct 2018, 85pgs.

\* cited by examiner

MINI-MACHINE LEARNING

FIELD OF THE TECHNOLOGY

The present invention relates to the field of machine learning and deep learning for artificial intelligence, in particular to mini-machine learning algorithms.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Machine learning techniques are now used in a large variety of applications. Decades of research have created a huge assortment of algorithms and techniques that can be applied to these applications. Selecting the best algorithm for an application may be difficult and resource intensive. For example, a classification task can be done by several algorithms such as support vector machines (SVMs), random forests, decision trees, artificial neural networks, and more. Each of these algorithms has many variations and configurations and performs differently for different datasets. Choosing the best algorithm is typically a manual task performed by a data scientist or a machine learning expert having years of experience.

On the other hand, if the full variety of machine learning techniques are automatically explored on a data, significant computational overhead will be incurred, so much so that it can even delay a machine learning based product entry to the market. Thus, automatically training and validating each one of the machine learning algorithms to find the best performing algorithm might not be feasible.

To avoid exploring each and every machine learning technique, automatic approaches to selective training typically ultimately use a single regressor/classifier for predicting algorithm performance without training or validating the algorithm. For example, such a regressor/classifier can be a "landmark" algorithm, which is applied to a data set (or a sample thereof) to predict the performance of an unrelated machine learning algorithm. Landmark algorithms such as a naive Bayes-type algorithm, k-nearest neighbor with one neighbor algorithm, Decision Tree stub, or principal component analysis (PCA)-based algorithm can be used to predict the performance of a neural network, a decision tree or a neural network algorithm.

However, since the machine learning algorithm, for which the landmark algorithm is used, is different than the landmark algorithm itself, the accuracy of the prediction is low. Thus, even though a machine learning algorithm may be selected based on landmarks, it may not, in reality, represent the best machine learning algorithm for predicting results.

Furthermore, the landmark algorithm approach also does not consider variants of the same algorithm, which can significantly affect the algorithm performance and behavior. Regardless of whether an automatic algorithm selection or any other approach is used to select a particular algorithm, the performance of the selected algorithm may vary based on variants in the same algorithm. The landmark algorithm, by virtue of itself being different from the machine learning algorithm to be selected, cannot be indicative of which variant of a particular machine learning algorithm would yield higher or lower accuracy. The landmark algorithm has no information and correlation to the particular machine learning algorithm and thus, cannot provide any material information for the variants of the particular machine algorithm.

BRIEF DESCRIPTION OF THE DRAWINGS

In the drawings of certain embodiments in which like reference numerals refer to corresponding parts throughout the figures.

DETAILED DESCRIPTION

In the following description, for the purposes of explanation, numerous specific details are set forth in order to provide a thorough understanding of the present invention. It will be apparent, however, that the present invention may be practiced without these specific details. In other instances, structures and devices are shown in block diagram form in order to avoid unnecessarily obscuring the present invention.

Training Machine Learning Model

Machine learning techniques include applying a machine learning algorithm on a training data set, for which outcome(s) are known, with initialized parameters which values are modified in each training iteration to more accurately yield the known outcome(s) (referred herein as "label(s)"). Based on such application(s), the techniques generate a machine learning model with known parameters. Thus, a machine learning model includes a model data representation or model artifact. A model artifact comprises parameters values, which are applied by a machine learning algorithm to the input to generate a predicted output. Training a machine learning model entails determining the parameter values of the model artifact. The structure and organization of the parameter values depend on the machine learning algorithm.

Accordingly, the term "machine learning algorithm" (or simply "algorithm") refers herein to a process or set of rules to be followed in calculations in which model artifact, comprising one or more parameters for the calculations, is unknown, while, the term "machine learning model" (or simply "model") refers herein to the process or set of rules to be followed in the calculations in which the model artifact, comprising the one or more parameters, is known and have been derived based on the training of the respective machine learning algorithm using one or more training data sets. Once trained, the input is applied to the machine learning model to make a prediction, which may also be referred to herein as a predicted outcome or output.

In supervised training, training data is used by a supervised training algorithm to train a machine learning model. The training data includes input and "known" output, label. In an embodiment, the supervised training algorithm is an iterative procedure. In each iteration, the machine learning algorithm applies the model artifact and the input to generate a predicted output. An error or variance between the predicted output and the known output is calculated using an objective function. In effect, the output of the objective function indicates the accuracy of the machine learning model based on the particular state of the model artifact in the iteration. By applying an optimization algorithm based on the objective function, the parameter values of the model artifact are adjusted. The iterations may be repeated until the desired accuracy is achieved or some other criteria are met.

In an embodiment, to iteratively train an algorithm to generate a trained model, a training data set may be arranged such that each row of the data set is input to a machine learning algorithm and further stores the corresponding actual outcome, label value, for the row. For example, each row of the adult income data set represents a particular adult for whom the outcome is known, such as whether the adult has a gross income over $500,000. Each column of the adult training dataset contains numerical representations of a particular adult characteristic (e.g. whether an adult has a college degree, age of an adult . . . ) based on which the algorithm when trained can accurately predict whether any adult (even one who has not been described by the training data set) has a gross income over $500,000.

The row values of a training data set may be provided as inputs to a machine learning algorithm and may be modified based on one or more parameters of the algorithm to yield a predicted outcome. The predicted outcome for a row is compared with the label value and based on the difference, an error value is calculated. One or more error values for the batch of rows are used in a statistical aggregate function to calculate an error value for the batch. The "loss" term refers to an error value for a batch of rows.

At each training iteration, based on calculated one or more predicted values, the corresponding loss values for the iteration is calculated. For the next training iteration, one or more parameters are modified to reduce the loss based on the current loss. Any number of iterations on a training data sets may be performed to reduce the loss. The training iterations using a training data set may be stopped when the change in the losses between the iterations is within a threshold. In other words, the iterations are stopped when the loss for different iterations is substantially the same.

After the training iterations, the generated machine learning model includes the machine learning algorithm with the model artifact that yielded the smallest loss.

For example, the above-mentioned adult income data set may be iterated using the Support Vector Machines (SVM) algorithm to train an SVM-based model for the adult income data set. Each row of the adult data set is provided as an input to the SVM algorithm, and the result, the predicted outcome, of the SVM algorithm is compared to the actual outcome for the row to determine the loss. Based on the loss, the parameters of the SMV are modified. The next row is provided to the SVM algorithm with the modified parameters to yield the next row's predicted outcome. The process may be repeated until the difference in loss values of the previous iteration, and the current iteration is below a pre-defined threshold, or in some embodiments, until the difference between the smallest loss value achieved and the current iteration's loss is below a pre-defined threshold.

Once the machine learning model for the machine learning algorithm is determined, a new data set, for which an outcome is unknown, may be used as an input to the model to calculate the predicted outcome(s) for the new data set.

In a software implementation, when a machine learning model is referred to as receiving an input, executed, and/or as generating output or prediction, a computer system process executing a machine learning algorithm applies the model artifact against the input to generate predicted output. A computer system process executes a machine learning algorithm by executing software configured to cause execution of the algorithm.

Machine Learning Algorithms and Domains

A machine learning algorithm may be selected based on the domain of the problem and the intended type of outcome required by the problem. The non-limiting examples of algorithm outcome types may be discrete values for problems in classification domain, continuous values for problems in regression domain, or anomaly detection problems in clustering domain.

However, even for a particular domain, there are many algorithms to choose from for selecting the most accurate algorithm to solve a given problem. As non-limiting examples, in a classification domain, Support Vector Machines (SVM), Random Forests (RF), Decision Trees (DT), Bayesian networks (BN), stochastic algorithms such as genetic algorithms (GA), or connectionist topologies such as artificial neural networks (ANN) may be used.

Implementations of machine learning may rely on matrices, symbolic models, and hierarchical and/or associative data structures. Parameterized (i.e., configurable) implementations of best of breed machine learning algorithms may be found in open source libraries such as Google's TensorFlow for Python and C++ or Georgia Institute of Technology's MLPack for C++. Shogun is an open source C++ ML library with adapters for several programming languages including C#, Ruby, Lua, Java, MatLab, R, and Python.

Hyper-Parameters, Cross-Validation and Algorithm Selection

A type of machine algorithm may have unlimited variants based on one or more hyper-parameters. The term "hyperparameter" refers to a parameter in a model artifact that is set before the training of the machine algorithm model and is not modified during the training of the model. In other words, a hyper-parameter is a constant value that affects (or controls) the generated trained model independent of the training data set. A machine learning model with a model artifact that has only hyper-parameter values set is referred to herein as a "variant of a machine learning algorithm" or simply "variant." Accordingly, different hyperparameter values for the same type of machine learning algorithm may yield significantly different loss values on the same training data set during the training of a model.

For example, the SVM machine learning algorithm includes two hyperparameters: "C" and "gamma." The "C" hyper-parameter may be set to any value from $10^{-3}$ to $10^5$, while the "gamma" hyper-parameter may be set $10^{-5}$ to $10^3$. Accordingly, there are endless permutations of the "C" and "gamma" parameters that may yield different loss values for training the same adult income training data set.

Therefore, to select a type of algorithm or moreover, to select the best performing variant of an algorithm, various hyper-parameter selection techniques are used to generate distinct sets of hyper-parameter values. Non-limiting examples of hyper-parameter value selection techniques include a Bayesian optimization such as a Gaussian process for hyper-parameter value selection, a random search, a gradient-based search, a grid search, hand-tuning techniques, a tree-structured Parzen Estimators (TPE) based technique.

With distinct sets of hyper-parameters values selected based on one or more of these techniques, each machine learning algorithm variant is trained on a training data set. A test data set is used as an input to the trained model for calculating the predicted result values. The predicted result values are compared with the corresponding label values to determine the performance score. The performance score may be computed based on calculating the error rate of predicted results in relation to the corresponding labels. For example, in a categorical domain if out of 10,000 inputs to the model only 9,000 matched the labels for the inputs, then the performance score is computed to be 90%. In non-categorical domains, the performance score may be further based on a statistical aggregation on the difference between the label value and the predicted result value.

The term "trial" refers herein to the training of a machine learning algorithm using a distinct set of hyper-parameter values and testing the machine learning algorithm using at least one test data set. In an embodiment, cross-validation techniques, such as k-fold cross-validation, is used to create many pairs of training and test datasets from an original training data set. Each pair of data sets, together, contains the original training data set but the pairs partition the original data set in different ways between a training data set and a test data set. For each pair of data sets, the training data set is used to train a model based on the selected set of hyperparameters, and the corresponding test data set is used for calculating the predicted result values with the trained model. Based on inputting the test data set to the trained machine learning model, the performance score for the pair (or fold) is calculated. If there are more than one pairs (i.e., fold), then the performance scores are statistically aggregated (e.g., average, mean, min, max) to yield a final performance score for the variant of the machine learning algorithm.

Each trial is computationally very expensive, as it includes multiple training iterations for a variant of machine algorithm to generate the performance score for one distinct set of hyper-parameter values of the machine learning algorithm. Accordingly, reducing the number of trials can dramatically reduce the necessary computational resources (e.g., processor time and cycles) for tuning.

Furthermore, since the performance scores are generated to select the most accurate algorithm variant, the more precise the performance score itself is, the more precise the generated model's prediction relative accuracy is compared to other variants. Indeed, once the machine learning algorithm and its hyper-parameter value-based variant are selected, a machine model is trained by applying the algorithm variant to the full training data set using the techniques discussed above. This generated machine learning model is expected to predict the outcome with more accuracy than the machine learning models of any other variant of the algorithm.

The precision of the performance score itself depends on how much computational resources are spent to tuning hyper-parameters for an algorithm. Computational resources can be wasted on testing sets of hyper-parameter values that cannot yield the desired accuracy of the eventual model.

Similarly, less (or no) computational resources may be spent on tuning those hyper-parameters for a type of algorithm that is most likely to be less accurate than another type of algorithm. Accordingly, the number of trials may be reduced or eliminated for hyper-parameters of discounted algorithms, thus substantially increasing the performance of the computer system.

Mini-Machine Learning Algorithm Overview

The approaches herein describe generating a variant of a machine learning algorithm that predicts the performance of a computationally more costly-to-train variant of the same type of machine learning algorithm. The "reference variant of algorithm" or simply "reference variant" term refers herein to the computationally more costly-to-train variant of the algorithm than another variant of the same type of machine learning algorithm. The "mini-machine learning algorithm variant" (or "mini-ML variant") term refers to a computationally less costly-to-train variant of a machine learning algorithm.

A system evaluates a machine learning algorithm to determine computational cost and accuracy impact of different distinct sets of hyper-parameter values, in an embodiment. The distinct set of hyper-parameter values, which are determined to yield an acceptable accuracy, while reducing the computational cost of training of the algorithm are included in the mini-ML variant.

In an embodiment, the accuracy and computational cost are measured in comparison with a reference variant of algorithm. A reference variant is selected as a baseline variant, of the machine learning algorithm, which is modified to generate a mini-ML variant. Through iterative evaluations of variants of the reference variant, a mini-ML variant is generated, and in each iteration, at least one hyper-parameter value of the reference variant is modified. The modified algorithm is evaluated using a training data set to determine a performance score and to determine the computational cost for training the modified algorithm using the training dataset. Based on the computational cost and the performance score, the system determines whether to select the modified hyper-parameter value for the mini-ML variant of the algorithm—the lesser is the computational cost, the more likely is the hyper-parameter value to be selected.

In an embodiment, the hyper-parameter value with the least computational cost is selected. The selection may be further based on the performance score meeting performance criteria for the mini-ML variant. The performance criteria may be based on the performance score of the reference variant.

Generating Reference Variant of Machine Learning Algorithm

Figure 1:
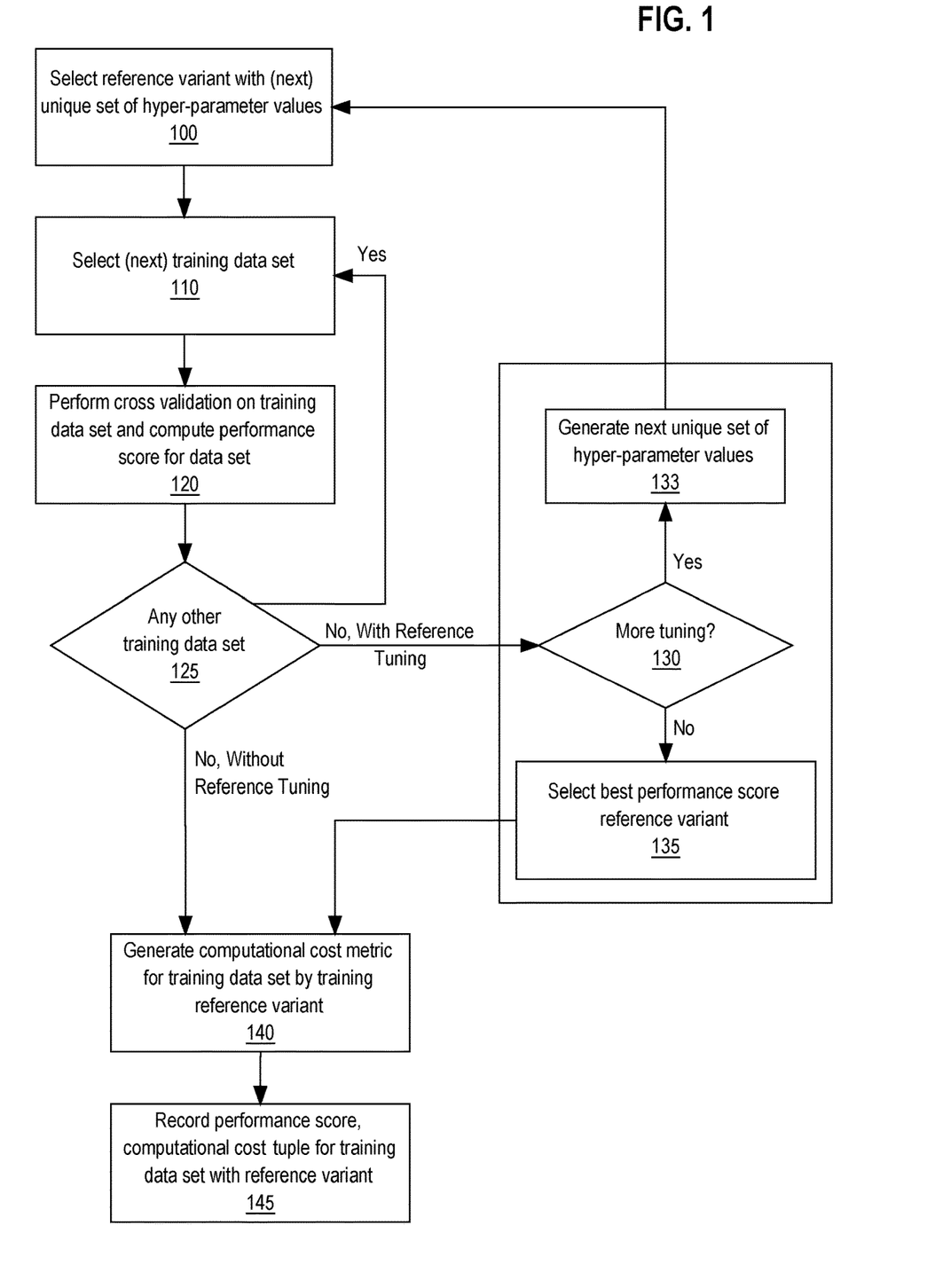
FIG. 1 is a flow diagram that depicts a process for generating metrics for a reference variant of a machine learning (ML) algorithm, in an embodiment.

FIG. 1 is a flow diagram that depicts a process for generating metrics for a reference variant, in an embodiment. At step 100, a computer system selects a reference variant with a pre-determined set of hyperparameters for a particular domain, in an embodiment. For example, based on previous experimentation, it has been shown that a particular "C" and "gamma" values yield the best performance for a categorization domain problem involving three or fewer input types. This variant of the SVM machine learning algorithm is then selected as a reference variant to generate a mini-ML variant. At step 110, a training data set is selected for cross-validation of the reference variant, and at step 120, cross-validation of the reference variant on the selected data set is performed. In some embodiments, the reference variant may already be associated with pre-recorded performance and cost metrics for datasets, which are used in generating the mini-ML variant. For example, the mini-ML variant is going to be generated based on one or more of the OpenML.org datasets, and the reference variant has already been cross-validated and trained using the same data sets.

In an embodiment, to obtain a performance score for a reference variant, the reference variant is cross-validated using a selected training data set that is also used for generating the mini-ML variant of the algorithm. The performance score may be computed by statistically aggregating the individual performance scores computed for each of the data set folds validation. At step 125, if other training datasets exist, the cross-validation is similarly performed using each of the other training data sets to generate corresponding performance scores for each of the other training data sets.

In another embodiment, a reference variant is generated based on tuning a particular type of algorithm on one or more training data sets in a particular domain. Using the techniques described above, different distinct sets of hyper-parameter are used to perform cross-validation on one or more data sets in a particular domain. The trial that yields the highest aggregated performance score for the training dataset(s) is selected as a reference variant.

For example, continuing with FIG. 1, at step 100, one of many variants of a machine learning algorithm is selected, but such an algorithm is not yet designated as a reference variant. At steps 110-125, cross-validations are performed on the training data sets using the selected variant of algorithm. At step 130, the system, using the hyper-parameter selection techniques and the performance score from the cross-validations, the system determines whether more tuning of hyper-parameter values for the reference variant is to be performed. If so, at step 133, the system, according to the techniques above, generates a new distinct set of hyper-parameter values thereby generating a new variant of algorithm. Steps 100-125 are repeated for the new variant until, at step 130, the system determines based on the generated performance scores that no further tuning is necessary. At step 135, the machine learning algorithm with the best performance score is selected as the reference variant.

Additionally or alternatively, regardless of techniques to select the reference variant, a computational cost metric is generated for the reference variant, at step 140. In one embodiment, the computational cost metric may be generated by measuring the time duration for generating a machine learning model by training the reference variant on a training data set. The time duration may be measured based on performing training using computational resources that are pre-defined.

Other embodiments of generating computation cost metric include, in addition or alternative to the time duration measurement, measurements based on one or more of memory consumption, processor utilization, or I/O activity measurement.

The computational cost metric for each training data set may be separately recorded. For example, continuing with FIG. 1, at step 145, a tuple is generated for each training data set that contains the computational cost metric and the performance score for that data set.

Generating Mini-Machine Learning Variant of Algorithm

In an embodiment, a mini-ML variant is generated based on a reference variant. The reference variant's hyper-parameter value(s) are modified to yield a mini-ML variant that is sufficiently similar to the reference variant in predicting outcomes but at the same time is computationally less costly. Stated differently, the mini-ML variant is a variant of the algorithm, which tracks the performance of the reference variant but is computationally cheaper to train on dataset(s).

Figure 2:
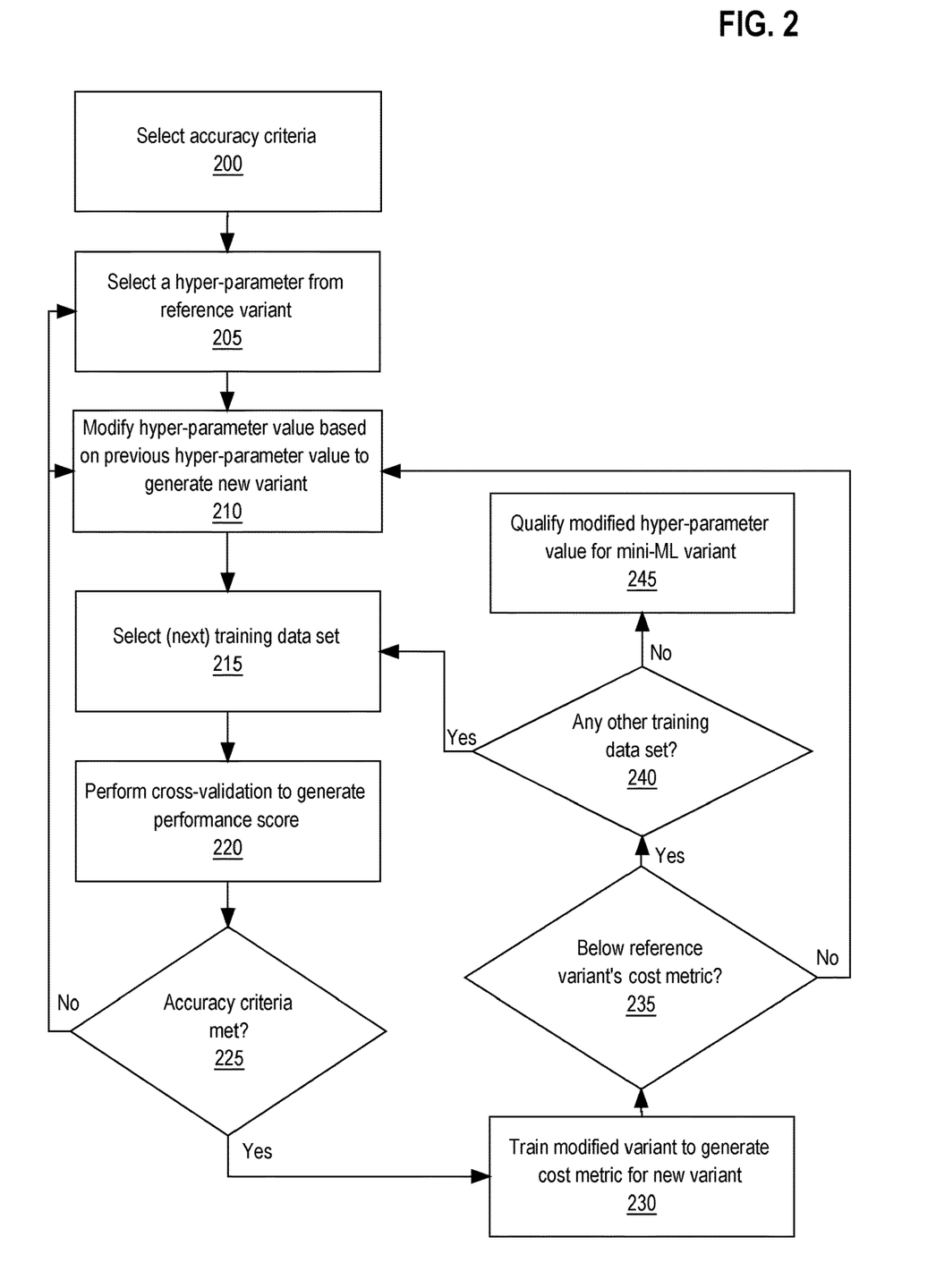
FIG. 2 is a flow diagram that depicts a process to generate a mini-machine learning (mini-ML) variant of an ML algorithm based on a reference variant of the ML algorithm, in an embodiment.

FIG. 2 is a flow diagram that depicts a process to generate a mini-ML variant based on a reference variant, in an embodiment. At step 200, an accuracy criterion is selected. The term "accuracy criteria" refers to the criterion that determines the acceptable measure of the deviation of the accuracy for the mini-ML variant from the accuracy of the reference variant. In an embodiment, the accuracy criteria is based on the difference between performance scores for reference variant and for the mini-ML variant, the difference between performance score(s) of the reference variant and corresponding performance scores of the mini-ML variant. For example, the accuracy criteria may indicate that the difference in the performance scores has to be within a particular percentage of each other, or below a particular absolute value.

At step 205, a hyper-parameter is selected from the reference variant to be modified to generate a new variant of the algorithm. The value of the selected hyper-parameter is modified in the reference variant at step 210 thereby generating the new variant of the algorithm.

In an embodiment, the hyper-parameter value is modified to cause less usage of computational resources for training than if the reference variant is used. For example, reducing the value of the hyper-parameter for a number of layers in a neural network algorithm causes the neural network's training to be less computationally costly. Similarly, reducing the hyper-parameter value representing the number of units in the first layer of neural networks also achieves a reduction of computational cost for the neural network algorithm.

In an embodiment in which a hyperparameters value is independent of the computation cost of training a model, any of the above-mentioned hyper-parameter value selection techniques (e.g., Bayesian, random search, gradient descent) is used to select a new hyper-parameter value.

At step 215, a training data set is selected from multiple training data sets for cross-validation of the new variant of algorithm that includes the new hyper-parameter value. The multiple training sets, available for the selection at step 215, are those for which performance scores exist or are to be computed for the reference variant using techniques described above. At step 220, the system performs cross-validation on the selected training data set and thereby, calculates a performance score for the selected training data set.

At step 225, the calculated performance score for the selected training data set is compared with the performance score of the reference variant for the same training data set. If the performance scores meet the accuracy criteria, then the process continues to step 230. If the performance scores do not meet the accuracy criteria, then the process reverts to either step 205 or step 210. Stated differently, if the performance score of the selected variant of the algorithm is similar to the performance score of the reference variant for the same data set, then the new variant qualifies as a candidate for a mini-ML variant of the algorithm.

For example, the accuracy criteria may specify a 10% maximum measure of deviation for a modified algorithm. In such an example, the difference of the performance scores over the performance score of the reference variant is computed and compared with the accuracy criteria of 10%. If the calculated ratio does not exceed 10%, then the accuracy criteria is met. Otherwise, the accuracy criteria has failed for the variant algorithm.

In an embodiment in which the accuracy criteria has failed, the process determines whether a new value of hyper-parameter is to be selected at step 210 or a new hyper-parameter itself is to be selected at step 205. The determination is based on whether the value selection for the hyper-parameter value is dependent or independent of the performance score. The hyper-parameter value selection technique based on the predicted computational cost may be expected to conversely affect the performance score.

For example, if for a neural network-based reference variant, the number of layers in the network hyper-parameter is being reduced in each iteration, then once the accuracy criteria is not met, the process is not going to perform a trial for even lower value for that hyper-parameter. The lower value of the hyper-parameter is expected to yield a less accurate model and thus is guaranteed to fail the accuracy criteria. Thus, the process may transition to another hyper-parameter at step 205.

Stated differently, if at step 210, the current hyper-parameter value was selected in such a way that it was likely to cause lower performance score than the previous hyper-parameter value of the same hyper-parameter, then similarly, the next hyper-parameter value is going to cause even a lower performance score than the current hyper-parameter value. Accordingly, the accuracy criteria is expected to fail for the next selection of the hyper-parameter value as well. In such a case, to save computational resources, the process transitions to step 205 to select a different hyper-parameter for the modified reference variant.

For the modified reference variant that meets the accuracy criteria at step 225, the process transitions to step 230. At step 230, the modified reference variant is trained on the selected training data set, and the cost metric for the training is tracked. For example, the time duration necessary to train the corresponding model on a defined configuration of computational resources may be recorded. In one embodiment, the process may determine the types of cost metrics that exist for the reference variant and measure the same cost metrics for the modified algorithm.

At step 235, the cost metric(s) for the reference variant and the modified reference variant for the selected training data set are compared. If the cost metrics for the modified reference variant indicate less computation cost for training a model than for the reference variant, then the selected hyper-parameter value continues to qualify for the mini-ML variant. For example, if the previously described training time duration metric for the modified reference variant is less than the same metric for the reference variant for the selected training data set, then the selected hyper-parameter value continues to qualify for the mini-ML variant of the algorithm.

In an embodiment, the modified reference variant is selected only if the cost metric(s) for each training data set indicate less resource consumption. In such an embodiment, the reference variant's cost metric(s) for each training data set is compared with the cost metric(s) of the modified reference variants for the respective data set. At step 235, if a cost metric for the modified reference variant indicate more computational resource consumption for training even for a single data set, the hyper-parameter value is rejected for the mini-ML variant.

In a related embodiment, the modified reference variant has to substantially improve on the computation cost for training a data set to be selected. In such an embodiment, the modified reference variant is rejected at step 235, if the cost metric fails to indicate a threshold amount of improvement in computation resources for training a data set. For example, a threshold may be defined to be 50% or greater improvement in cost over the reference variant. The reference variant's cost metric is divided by the modified algorithm's cost metric, and if the division in percentage is equal to or greater than 50%, then the hyper-parameter value qualifies for the mini-ML variant.

In another embodiment, the modified reference variant may not be rejected at step 235 unless the cost metric for each and every selected training data set indicates less computational cost for the modified reference variant. In such an embodiment, at step 240, the modified hyper-parameter value may be qualified if, for a threshold number of data sets, the modified hyper-parameter value-based algorithm is less costly than the reference variant. The threshold number may be determined based on the percentage of a total number of training data sets available for the process. For example, if the threshold percentage is 90% percent, if for 9 out of 10 training data sets, the modified hyper-parameter value-based algorithm is less costly, then the hyper-parameter value is qualified for the mini-ML variant.

At step 245, if more than one hyper-parameter values are qualified for a hyper-parameter, the hyper-parameter value for which the modified algorithm has yielded the lowest cost metric (the least costly in computation resources) is selected for the mini-ML variant. To determine the hyper-parameter value to be selected for the hyper-parameter, the cost metrics for each hyper-parameter are statistically aggregated, and the hyper-parameter value with the best performing statistically aggregated cost metric is selected (e.g., the lowest aggregate cost metric value).

In an embodiment, if no modified value for a hyper-parameter has qualified for the mini-ML variant, the original hyper-parameter value of the reference variant is used for the particular hyper-parameter in the mini-ML variant.

Figure 3A:
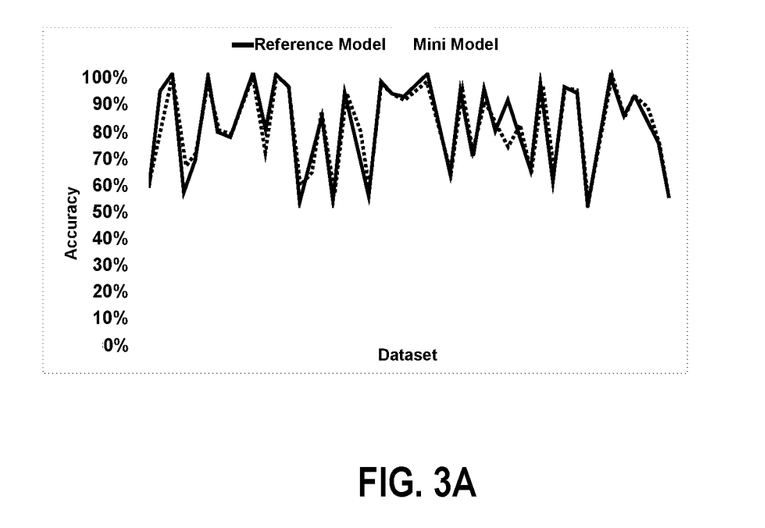
FIG. 3A is a graph that depicts performance scores of a reference variant of ML algorithm and of a mini-ML variant of ML algorithm for multiple training data sets, in an embodiment.

FIG. 3A is a graph that depicts performance scores of a reference variant and of the mini-ML variant of the algorithm for multiple training data sets, in an embodiment. Each of the points on the graph corresponds to a performance score for a particular data set in OpenML.org datasets. The line for the reference data set overlaps with the line for the mini-ML variants, denoting that the mini-ML variant closely tracks the reference variant performance.

Figure 3B:
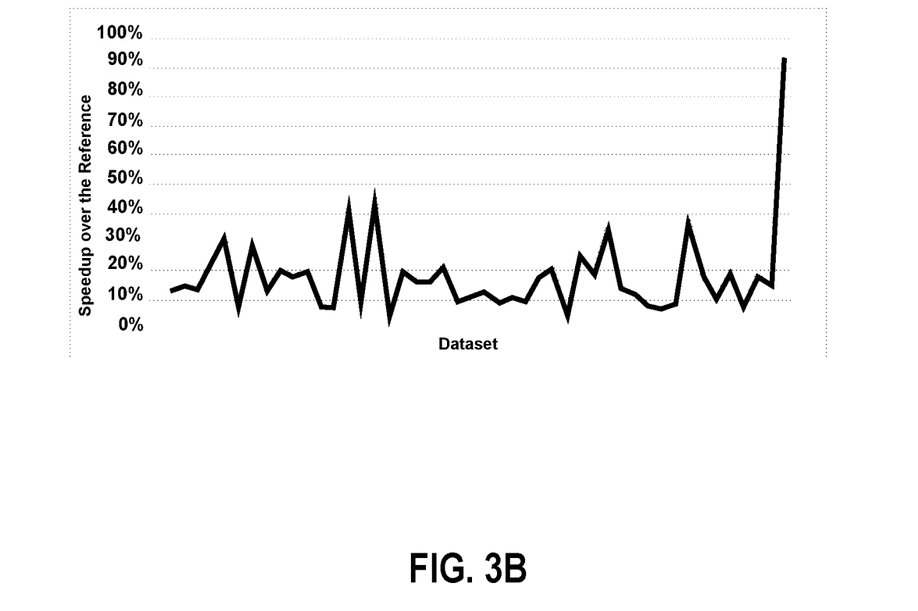
FIG. 3B is a graph that depicts speedup percentages of mini-ML variants over reference variants for training data sets, in an embodiment.

FIG. 3B is a graph that depicts speedup percentages of the same mini-ML variant as in FIG. 3A over the same reference variant as in FIG. 3A for training training data sets, in an embodiment. Each point is a percentage ratio of the difference of time durations for training a particular data set with a reference variant and with the corresponding mini-ML variant over the reference variant's time duration for training the same data set. As depicted, the mini-ML variant represents a considerable speedup in training a model over the reference model for the OpenML.org datasets without losing the accuracy of the reference variant, as depicted by the performance scores in FIG. 3A.

Usage of Mini-Machine Learning Algorithm

As a mini-machine learning variant of algorithm is less costly to train than a reference variant while tracking the performance thereof, the mini-machine learning of algorithm is used to determine the performance of the reference variant on a data set, in an embodiment. For example, rather than cross-validating multiple different reference variants for a new training data set to determine which reference variant will perform the best for the new dataset, the corresponding mini-ML variants may be used for such a determination. The mini-ML variants are cross-validated in the place of the corresponding reference variants, which saves a significant amount of computation resources. Based on the computed performance scores from the cross-validation of the mini-ML, the reference variant, whose mini-ML variant has scored the best, is chosen. Accordingly, the selection process of the reference variants is performed using the respective mini-ML variants to save computational resources.

In another embodiment, mini-ML variants' performance scores on training data sets are used to train meta-models for hyper-parameter value selection or a machine algorithm selection. One or more reference variants, for which hyper-parameters are being tuned or which are considered for the algorithm selection, are selected. The generated mini-ML variants corresponding to the reference variants are identified to generate meta-feature values for training data sets. In one embodiment, the system has recorded the performance scores for respective training data sets when generating the mini-ML variants and thus, the performance scores can be readily used as the meta-features in training a meta-model. For a training data set for which the system has no performance scores for the mini-ML variants, cross-validations of the mini-ML variants are performed on the training data set.

Figure 4:
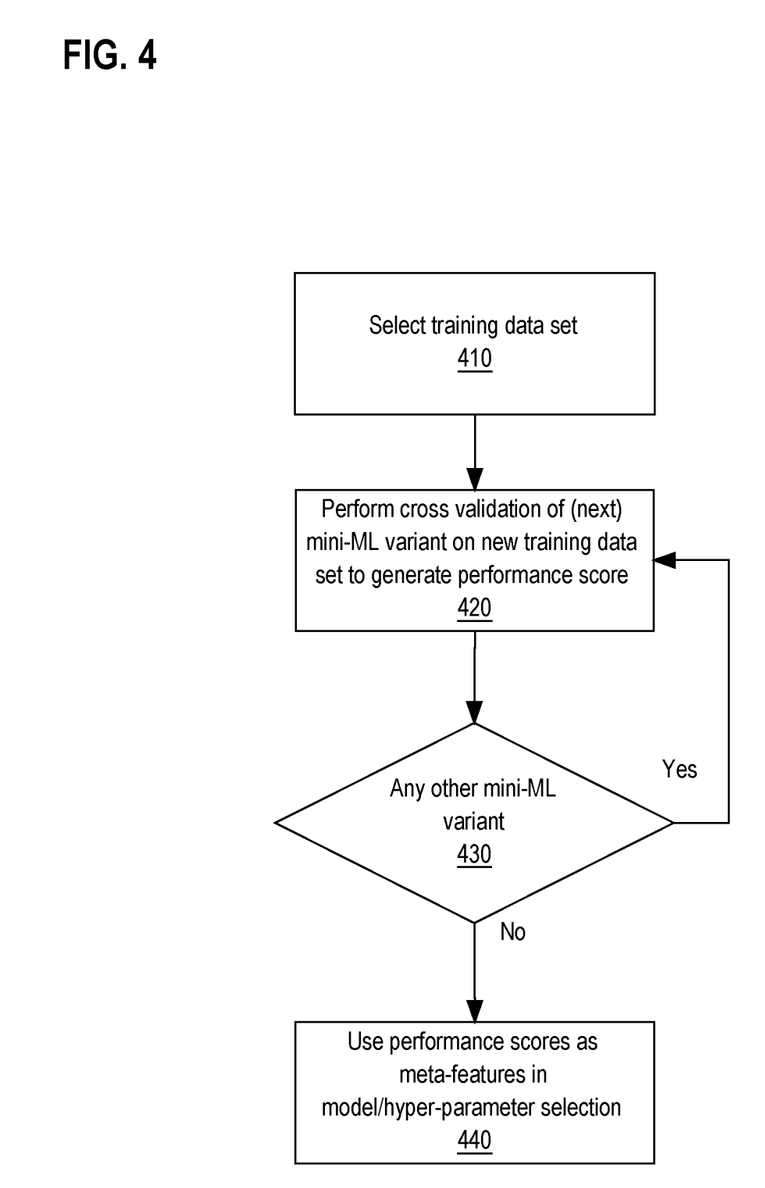
FIG. 4 is a flow diagram that depicts generating mini-ML variant-based meta-feature(s) for the data set, in an embodiment.

FIG. 4 is a flow diagram that depicts generating mini-ML variant-based meta-feature(s) for a data set, in an embodiment. At step 410, a training data set is selected for which the mini-ML variant-based meta-feature(s) are to be generated. At step 420, a mini-ML variant is cross-validated on the selected training data set to generate a performance score for the mini-ML variant for the training dataset. If at step 430, another mini-ML variant exists, then the other mini-ML variant is cross-validated on the selected dataset to yield another performance scores until all the mini-ML variants have been cross-validated for the selected training data set. At step 440, the generated performance scores are designated as meta-features for the selected data set.

In one or more embodiments, the mini-ML variant-based generated meta-features in addition to or alternative to the existing meta-features of training data sets are used in training meta-model(s) for tuning hyper-parameter values and/or selecting a machine learning algorithm, based on techniques described in "Scalable and Efficient Distributed Auto-tuning of Machine Learning and Deep Learning Models", Appln. No. 62/563,893, filed on Sep. 27, 2017, in "Using Meta-learning for Automatic Gradient-based Hyper-parameter Optimization for Machine Learning and Deep Learning Models," application Ser. No. 15/914,883, filed on Mar. 7, 2018, in "Algorithm-specific Neural Network Architectures for Automatic Machine Learning Model Selection," application Ser. No. 15/884,163, filed on Jan. 30, 2018, and/or in "Gradient-based Auto-Tuning for Machine Learning and Deep Learning Models," application Ser. No. 15/885,515, filed Jan. 31, 2018; the entire contents of each of the applications are hereby incorporated by reference.

For any new data set, a hyper-parameter value selection or a machine algorithm model selection is performed by applying the new data set's meta-features as input to the trained meta-model, in an embodiment. The system performs cross-validation of the mini-ML variants on the new data set, and the resulting performance scores are used as the meta-feature values. The meta-feature values for the new data set, including that for the mini-ML variant(s), are provided as the input to the meta-model. The output of the meta-model indicates a predicted best-performing machine learning algorithm and/or the predicted best performing one or more hyper-parameter value(s) for the machine learning algorithm.

Mini-ML variants, as meta-features, significantly improve the accuracy of the meta-model because the mini-ML variants track the performance of the corresponding reference variants. Thus, the meta-learning algorithm has accurate input that describes data set(s) performance for various machine learning algorithm, therefore yielding a more accurate meta-model. The improved accuracy of the meta-model is achieved at a fraction of computational cost because a mini-ML variant is less costly to train or cross-validate on a data set than the reference variant.

Software Overview

Figure 5:
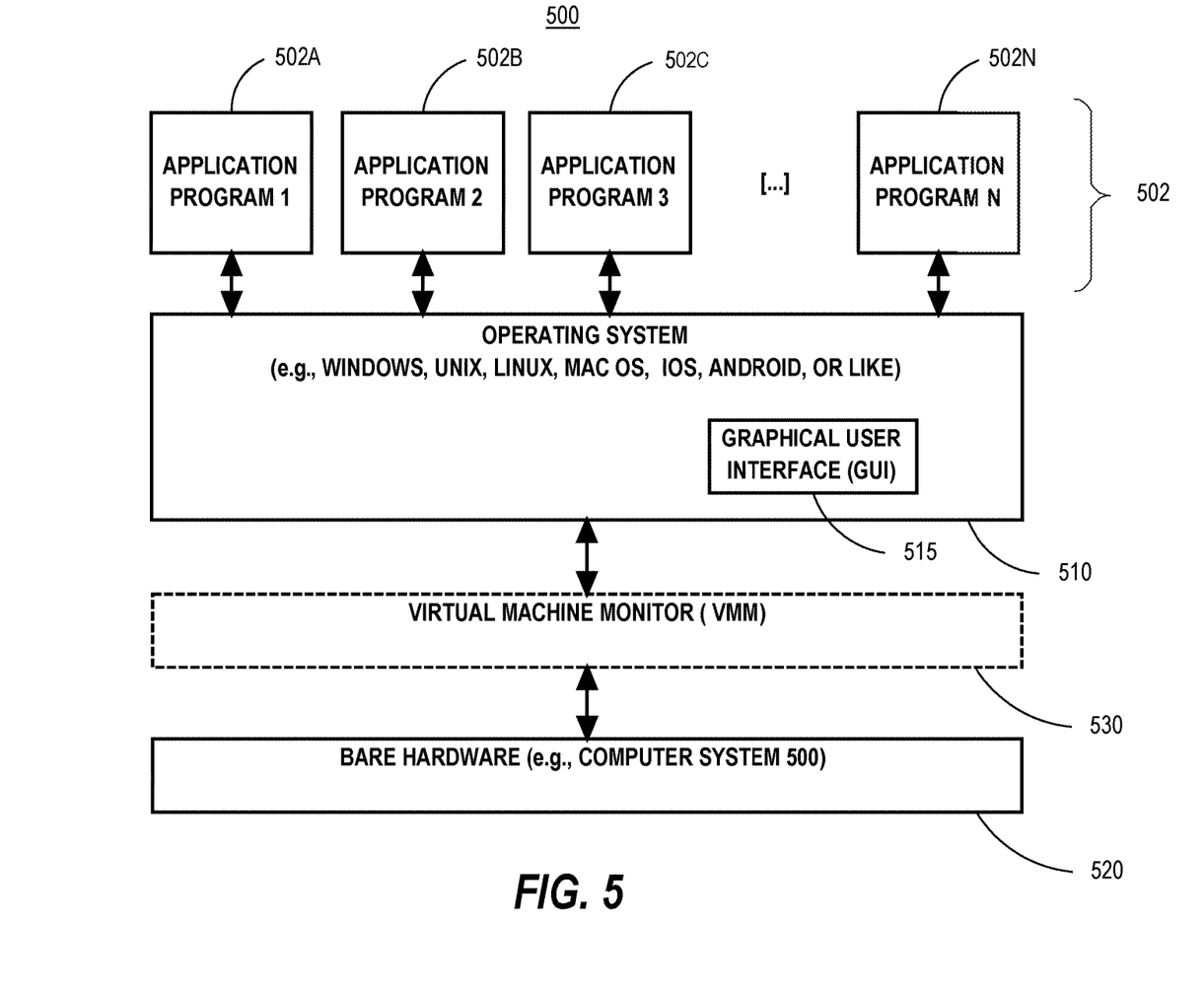
FIG. 5 is a block diagram of a basic software system, in one or more embodiments.
Figure 6:
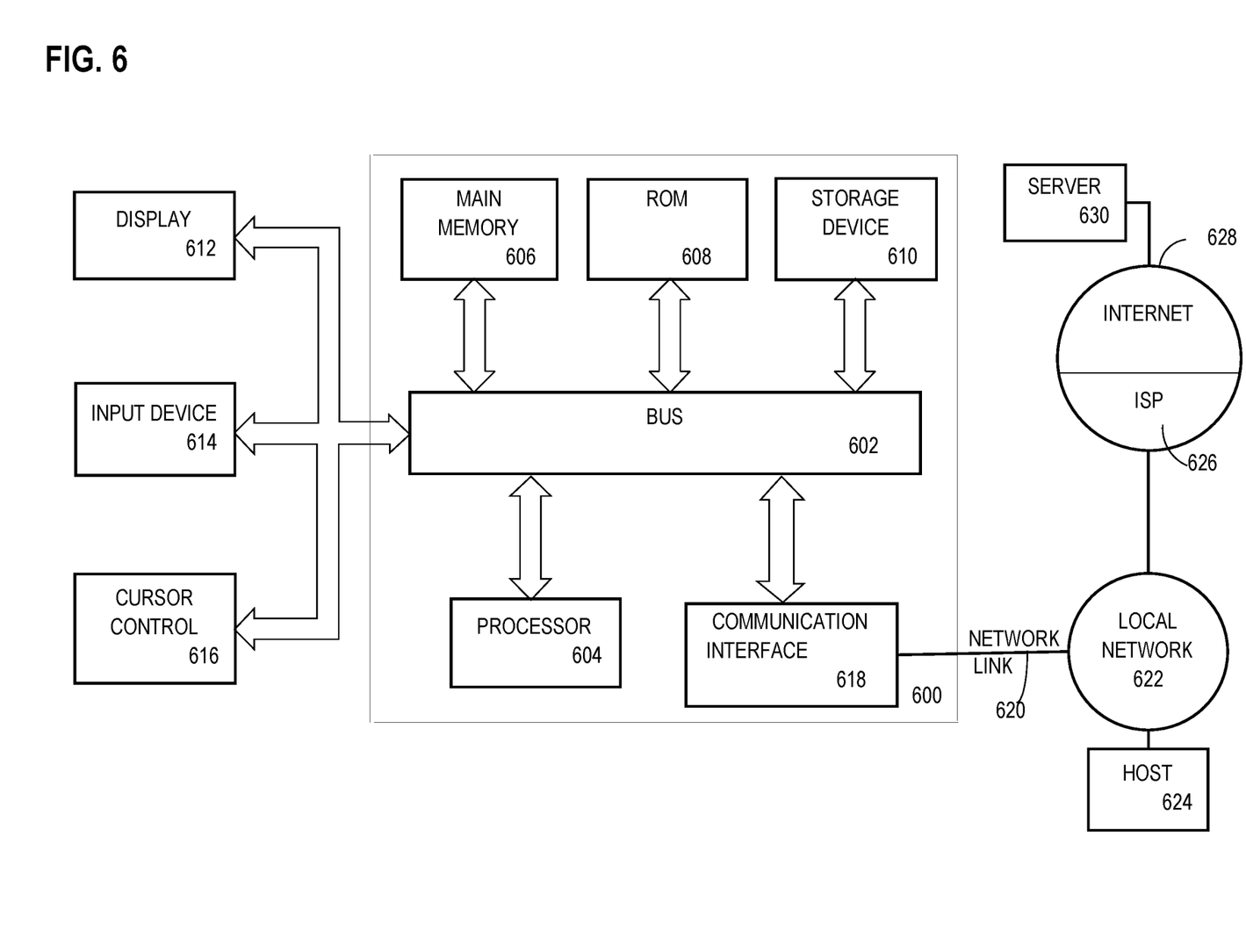
FIG. 6 is a block diagram that illustrates a computer system upon which an embodiment of the invention may be implemented.

FIG. 5 is a block diagram of a basic software system 500 that may be employed for controlling the operation of computing system 600 of FIG. 6. Software system 500 and its components, including their connections, relationships, and functions, is meant to be exemplary only, and not meant to limit implementations of the example embodiment(s). Other software systems suitable for implementing the example embodiment(s) may have different components, including components with different connections, relationships, and functions.

Software system 500 is provided for directing the operation of computing system 600. Software system 500, which may be stored in system memory (RAM) 606 and on fixed storage (e.g., hard disk or flash memory) 610, includes a kernel or operating system (OS) 510.

The OS 510 manages low-level aspects of computer operation, including managing execution of processes, memory allocation, file input and output (I/O), and device I/O. One or more application programs, represented as 502A, 502B, 502C . . . 502N, may be "loaded" (e.g., transferred from fixed storage 610 into memory 606) for execution by the system 500. The applications or other software intended for use on computer system 600 may also be stored as a set of downloadable computer-executable instructions, for example, for downloading and installation from an Internet location (e.g., a Web server, an app store, or another online service).

Software system 500 includes a graphical user interface (GUI) 515, for receiving user commands and data in a graphical (e.g., "point-and-click" or "touch gesture") fashion. These inputs, in turn, may be acted upon by the system 500 in accordance with instructions from operating system 510 and/or application(s) 502. The GUI 515 also serves to display the results of operation from the OS 510 and application(s) 502, whereupon the user may supply additional inputs or terminate the session (e.g., log off).

OS 510 can execute directly on the bare hardware 520 (e.g., processor(s) 604) of computer system 600. Alternatively, a hypervisor or virtual machine monitor (VMM) 530 may be interposed between the bare hardware 520 and the OS 510. In this configuration, VMM 530 acts as a software "cushion" or virtualization layer between the OS 510 and the bare hardware 520 of the computer system 600.

VMM 530 instantiates and runs one or more virtual machine instances ("guest machines"). Each guest machine comprises a "guest" operating system, such as OS 510, and one or more applications, such as application(s) 502, designed to execute on the guest operating system. The VMM 530 presents the guest operating systems with a virtual operating platform and manages the execution of the guest operating systems.

In some instances, the VMM 530 may allow a guest operating system to run as if it is running on the bare hardware 520 of computer system 600 directly. In these instances, the same version of the guest operating system configured to execute on the bare hardware 520 directly may also execute on VMM 530 without modification or reconfiguration. In other words, VMM 530 may provide full hardware and CPU virtualization to a guest operating system in some instances.

In other instances, a guest operating system may be specially designed or configured to execute on VMM 530 for efficiency. In these instances, the guest operating system is "aware" that it executes on a virtual machine monitor. In other words, VMM 530 may provide para-virtualization to a guest operating system in some instances.

A computer system process comprises an allotment of hardware processor time, and an allotment of memory (physical and/or virtual), the allotment of memory being for storing instructions executed by the hardware processor, for storing data generated by the hardware processor executing the instructions, and/or for storing the hardware processor state (e.g. content of registers) between allotments of the hardware processor time when the computer system process is not running. Computer system processes run under the control of an operating system and may run under the control of other programs being executed on the computer system.

Multiple threads may run within a process. Each thread also comprises an allotment of hardware processing time but share access to the memory allotted to the process. The memory is used to store the content of processors between the allotments when the thread is not running. The term thread may also be used to refer to a computer system process in multiple threads are not running.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

For example, FIG. 6 is a block diagram that illustrates a computer system 600 upon which an embodiment of the invention may be implemented. Computer system 600 includes a bus 602 or another communication mechanism for communicating information, and a hardware processor 604 coupled with bus 602 for processing information. Hardware processor 604 may be, for example, a general purpose microprocessor.

Computer system 600 also includes a main memory 606, such as a random access memory (RAM) or another dynamic storage device, coupled to bus 602 for storing information and instructions to be executed by processor 604. Main memory 606 also may be used for storing temporary variables or other intermediate information during execution of instructions to be executed by processor 604. Such instructions, when stored in non-transitory storage media accessible to processor 604, render computer system 600 into a special-purpose machine that is customized to perform the operations specified in the instructions.

Computer system 600 further includes a read only memory (ROM) 608 or other static storage device coupled to bus 602 for storing static information and instructions for processor 604. A storage device 610, such as a magnetic disk or optical disk, is provided and coupled to bus 602 for storing information and instructions.

Computer system 600 may be coupled via bus 602 to a display 612, such as a cathode ray tube (CRT), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

Computer system 600 may implement the techniques described herein using customized hard-wired logic, one or more ASICs or FPGAs, firmware and/or program logic which in combination with the computer system causes or programs computer system 600 to be a special-purpose machine. According to one embodiment, the techniques herein are performed by computer system 600 in response to processor 604 executing one or more sequences of one or more instructions contained in main memory 606. Such instructions may be read into main memory 606 from another storage medium, such as storage device 610. Execution of the sequences of instructions contained in main memory 606 causes processor 604 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 610. Volatile media includes dynamic memory, such as main memory 606. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 602. Transmission media can also take the form of acoustic or light waves, such as those generated during radio-wave and infra-red data communications.

Various forms of media may be involved in carrying one or more sequences of one or more instructions to processor 604 for execution. For example, the instructions may initially be carried on a magnetic disk or solid state drive of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal, and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card, cable modem, satellite modem, or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626, in turn, provides data communication services through the world wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are example forms of transmission media.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618.

The received code may be executed by processor 604 as it is received, and/or stored in storage device 610, or other non-volatile storage for later execution.

What is claimed is:

1. A computer-implemented method comprising:
selecting a reference variant of a machine learning algorithm, the reference variant of the machine learning algorithm indicating at least one hyper-parameter having at least one original hyper-parameter value;
modifying the at least one hyper-parameter from the at least one original hyper-parameter value to a new hyper-parameter value thereby generating a new variant of the machine learning algorithm with the at least one hyper-parameter having the new hyper-parameter value;
determining a performance score of the new variant of the machine learning algorithm using a training data set, the performance score representing an accuracy of a new machine learning model generated by training the new variant of the machine learning algorithm with the training data set;
comparing the performance score of the new variant of the machine learning algorithm for the training data set with a performance score of the reference variant of the machine learning algorithm for the training data set to determine at least one difference, of a plurality of differences in performance scores, between the performance score of the new variant of the machine learning algorithm and the performance score of the reference variant of the machine learning algorithm;
determining that the at least one difference satisfies one or more accuracy criteria, while the performance score of the new variant having a lower performance score than the performance score of the reference variant;
determining a cost metric of the new variant of the machine learning algorithm by measuring usage of computing resources when training the new variant of the machine learning algorithm on the training data set;
based, at least in part, on the cost metric of the new variant of the machine learning algorithm indicating that the new variant is computationally less costly than the reference variant, and based, at least in part, on the plurality of differences in performance scores meeting the one or more accuracy criteria including the at least one difference satisfying the one or more accuracy criteria, while the performance score of the new variant having a lower performance score than the performance score of the reference variant, for new data sets, using said new variant of the machine learning algorithm as a mini-ML variant to determine performance of the mini-ML variant, wherein the performance of the mini-ML variant represents performance of the reference variant based on the new data sets;
wherein the one or more accuracy criteria determine acceptable measure of the plurality of differences in the performance scores of the new variant of the machine learning algorithm and of the reference variant of the machine learning algorithm.

2. The method of claim 1, further comprising:
based on comparing the performance score of the new variant of the machine learning algorithm for the training data set with the performance score of the reference variant of the machine learning algorithm for the training data set, determining that the new variant of the machine learning algorithm meets the one or more accuracy criteria based on the performance score of the reference variant of the machine learning algorithm;
determining to select the new hyper-parameter value for the mini-ML variant of the machine learning algorithm based on the cost metric of the new variant of the machine learning algorithm.

3. The method of claim 1, wherein determining the performance score of the new variant of the machine learning algorithm using the training data set further comprises performing cross-validation of the new variant of the machine learning algorithm on the training data set.

4. The method of claim 1, further comprising determining the performance score of the reference variant by performing cross-validation of the reference variant on the training data set.

5. The method of claim 1, further comprising generating the reference variant by:
- selecting, for the machine learning algorithm, a distinct set of hyper-parameter values from a plurality of distinct sets of hyper-parameter values;
- performing cross-validation of the machine learning algorithm on one or more training data sets;
- based on performing cross-validation of the machine learning algorithm, determining whether to select the distinct set of hyper-parameter values for the reference variant.

6. The method of claim 5, further comprising selecting the distinct set of hyper-parameter values from the plurality of distinct sets of hyper-parameter values based on one of: a Bayesian optimization, a random search, a gradient-based search, a grid search, or a Tree-structured Parzen Estimators (TPE) based selection.

7. The method of claim 1, further comprising:
- determining a cost metric of the reference variant by measuring usage of computing resources for training of the reference variant on the training data set;
- comparing the cost metric of the new variant of the machine learning algorithm with the cost metric of the reference variant;
- based on comparing the cost metric of the new variant of the machine learning algorithm with the cost metric of the reference variant, determining that the cost metric of the new variant of the machine learning algorithm is lower than the cost metric for the reference variant;
- based on determining that the cost metric of the new variant of the machine learning algorithm is lower than the cost metric for the reference variant, qualifying the new hyper-parameter value for the mini-ML variant of the machine learning algorithm.

8. The method of claim 1, further comprising:
- based on the cost metric of the new variant of the machine learning algorithm and comparing the performance score of the new variant of the machine learning algorithm for the training data set with the performance score of the reference variant of the machine learning algorithm for the training data set, qualifying the new hyper-parameter value for the mini-ML variant of the machine learning algorithm;
- modifying the at least one hyper-parameter from the at least one original hyper-parameter value to another hyper-parameter value thereby generating another machine learning algorithm with the at least one hyper-parameter having the other hyper-parameter value;
- comparing a performance score of the other machine learning algorithm for the training data set with the performance score of the reference variant of the machine learning algorithm for the training data set;
- based on a cost metric of the other machine learning algorithm and comparing the performance score of the other machine learning algorithm with the performance score of the reference variant of the machine learning algorithm, qualifying the other hyper-parameter value for the mini-ML variant of the machine learning algorithm;
- based on the cost metric of the other machine learning algorithm and the cost metric of the new variant of the machine learning algorithm, determining whether to select the new hyper-parameter value or the other hyper-parameter value for the mini-ML variant of the machine learning algorithm.

9. The method of claim 1, wherein the new hyper-parameter value is based on a previous hyper-parameter value of a previous machine learning algorithm generated from the reference variant of the machine learning algorithm.

10. The method of claim 1, further comprising:
- based on comparing a performance score of another variant of the machine learning algorithm for the training data set with the performance score of the reference variant of the machine learning algorithm for the training data set, determining that the other variant of the machine learning algorithm fails to meet the one or more accuracy criteria based on the performance score of the reference variant of the machine learning algorithm;
- based on determining that the other variant of the machine learning algorithm fails to meet the one or more accuracy criteria, determining not to select the new hyper-parameter value for the mini-ML variant of the machine learning algorithm;
- modifying the at least one hyper-parameter from the at least one original hyper-parameter value to a next hyper-parameter value thereby generating a next machine learning algorithm from the reference variant of the machine learning algorithm with the at least one hyper-parameter having the next hyper-parameter value;
- without performing cross-validation of the next machine learning algorithm on the training data set, determining that the next machine learning algorithm is less accurate than the other variant of the machine learning algorithm.

11. The method of claim 1, wherein the reference variant of the machine learning algorithm is one of a plurality of reference variants, each reference variant of the plurality of reference variants corresponding to a respective machine learning algorithm of machine learning algorithms, and wherein, for said each reference variant of the plurality of reference variants, a corresponding mini-ML, less costly, variant of a corresponding plurality of mini-ML variants, less costly, variants is generated, the corresponding plurality of mini-ML variants includes the new variant of the machine learning algorithm, and the method further comprising:
- receiving a request to determine expected performances of the plurality of reference variants for a particular training data set;
- for said each reference variant of the plurality of reference variants, selecting a respective mini-ML variant;
- performing cross-validation of the respective mini-ML variant thereby generating a corresponding particular performance score of said each reference variant;
- based on the corresponding particular performance score, determining whether said each reference variant of the plurality of reference variants, when trained by the particular training data set, yields most accuracy.

12. One or more non-transitory computer-readable media storing instructions, wherein the instructions include a sequence of instructions, which, when executed by one or more hardware processors, cause:
- selecting a reference variant of a machine learning algorithm, the reference variant of the machine learning algorithm indicating at least one hyper-parameter having at least one original hyper-parameter value;
- modifying the at least one hyper-parameter from the at least one original hyper-parameter value to a new hyper-parameter value thereby generating a new variant of the machine learning algorithm with the at least one hyper-parameter having the new hyper-parameter value;

determining a performance score of the new variant of the machine learning algorithm using a training data set, the performance score representing an accuracy of a new machine learning model generated by training the new variant of the machine learning algorithm with the training data set;

comparing the performance score of the new variant of the machine learning algorithm for the training data set with a performance score of the reference variant of the machine learning algorithm for the training data set to determine at least one difference, of a plurality of differences in performance scores, between the performance score of the new variant of the machine learning algorithm and the performance score of the reference variant of the machine learning algorithm;

determining that the at least one difference satisfies one or more accuracy criteria, while the performance score of the new variant having a lower performance score than the performance score of the reference variant;

determining a cost metric of the new variant of the machine learning algorithm by measuring usage of computing resources when training the new variant of the machine learning algorithm on the training data set;

based, at least in part, on the cost metric of the new variant of the machine learning algorithm indicating that the new variant is computationally less costly than the reference variant, and based, at least in part, on the plurality of differences in performance scores meeting the one or more accuracy criteria including the at least one difference satisfying the one or more accuracy criteria, while the performance score of the new variant having a lower performance score than the performance score of the reference variant, for new data sets, using said new variant of the machine learning algorithm as a mini-ML variant to determine performance of the mini-ML variant, wherein the performance of the mini-ML variant represents performance of the reference variant based on the new data sets;

wherein the one or more accuracy criteria determine acceptable measure of the plurality of differences in the performance scores of the new variant of the machine learning algorithm and of the reference variant of the machine learning algorithm.

13. The one or more non-transitory computer-readable media of claim 12, wherein the sequence of instructions further includes instructions, which, when executed by said one or more hardware processors, cause:
based on comparing the performance score of the new variant of the machine learning algorithm for the training data set with the performance score of the reference variant of the machine learning algorithm for the training data set, determining that the new variant of the machine learning algorithm meets the one or more accuracy criteria based on the performance score of the reference variant of the machine learning algorithm;
determining to select the new hyper-parameter value for the mini-ML variant of the machine learning algorithm based on the cost metric of the new variant of the machine learning algorithm.

14. The one or more non-transitory computer-readable media of claim 12, wherein the sequence of instructions further includes instructions, which, when executed by one or more hardware processors, cause performing cross-validation of the new variant of the machine learning algorithm on the training data set.

15. The one or more non-transitory computer-readable media of claim 12, wherein the sequence of instructions further includes instructions, which, when executed by said one or more hardware processors, cause determining the performance score of the reference variant by performing cross-validation of the reference variant on the training data set.

16. The one or more non-transitory computer-readable media of claim 12, wherein the sequence of instructions further includes instructions, which, when executed by said one or more hardware processors, cause generating the reference variant by:
selecting, for the machine learning algorithm, a distinct set of hyper-parameter values from a plurality of distinct sets of hyper-parameter values;
performing cross-validation of the machine learning algorithm on one or more training data sets;
based on performing cross-validation of the machine learning algorithm, determining whether to select the distinct set of hyper-parameter values for the reference variant.

17. The one or more non-transitory computer-readable media of claim 16, wherein the sequence of instructions further includes instructions, which, when executed by said one or more hardware processors, cause selecting the distinct set of hyper-parameter values from the plurality of distinct sets of hyper-parameter values based on one of: a Bayesian optimization, a random search, a gradient-based search, a grid search, or a Tree-structured Parzen Estimators (TPE) based selection.

18. The one or more non-transitory computer-readable media of claim 12, wherein the sequence of instructions further includes instructions, which, when executed by said one or more hardware processors, cause:
determining a cost metric of the reference variant by measuring usage of computing resources for training of the reference variant on the training data set;
comparing the cost metric of the new variant of the machine learning algorithm with the cost metric of the reference variant;
based on comparing the cost metric of the new variant of the machine learning algorithm with the cost metric of the reference variant, determining that the cost metric of the new variant of the machine learning algorithm is lower than the cost metric for the reference variant;
based on determining that the cost metric of the new variant of the machine learning algorithm is lower than the cost metric for the reference variant, qualifying the new hyper-parameter value for the mini-ML variant of the machine learning algorithm.

19. The one or more non-transitory computer-readable media of claim 12, wherein the sequence of instructions further includes instructions, which, when executed by said one or more hardware processors, cause:
based on the cost metric of the new variant of the machine learning algorithm and comparing the performance score of the new variant of the machine learning algorithm for the training data set with the performance score of the reference variant of the machine learning algorithm for the training data set, qualifying the new hyper-parameter value for the mini-ML variant of the machine learning algorithm;
modifying the at least one hyper-parameter from the at least one original hyper-parameter value to another hyper-parameter value thereby generating another machine learning algorithm with the at least one hyper-parameter having the other hyper-parameter value;

comparing a performance score of the other machine learning algorithm for the training data set with the performance score of the reference variant of the machine learning algorithm for the training data set;

based on a cost metric of the other machine learning algorithm and comparing the performance score of the other machine learning algorithm with the performance score of the reference variant of the machine learning algorithm, qualifying the other hyper-parameter value for the mini-ML variant of the machine learning algorithm;

based on the cost metric of the other machine learning algorithm and the cost metric of the new variant of the machine learning algorithm, determining whether to select the new hyper-parameter value or the other hyper-parameter value for the mini-ML variant of the machine learning algorithm.

20. The one or more non-transitory computer-readable media of claim 12, wherein the new hyper-parameter value is based on a previous hyper-parameter value of a previous machine learning algorithm generated from the reference variant of the machine learning algorithm.

21. The one or more non-transitory computer-readable media of claim 12, wherein the sequence of instructions further includes instructions, which, when executed by said one or more hardware processors, cause:

based on comparing a performance score of another variant of the machine learning algorithm for the training data set with the performance score of the reference variant of the machine learning algorithm for the training data set, determining that the other variant of the machine learning algorithm fails to meet the one or more accuracy criteria based on the performance score of the reference variant of the machine learning algorithm;

based on determining that the other variant of the machine learning algorithm fails to meet the one or more accuracy criteria, determining not to select the new hyper-parameter value for the mini-ML variant of the machine learning algorithm;

modifying the at least one hyper-parameter from the at least one original hyper-parameter value to a next hyper-parameter value thereby generating a next machine learning algorithm from the reference variant of the machine learning algorithm with the at least one hyper-parameter having the next hyper-parameter value;

without performing cross-validation of the next machine learning algorithm on the training data set, determining that the next machine learning algorithm is less accurate than the other variant of the machine learning algorithm.

22. The one or more non-transitory computer-readable media of claim 12, wherein the reference variant of the machine learning algorithm is one of a plurality of reference variants, each reference variant of the plurality of reference variants corresponding to a respective machine learning algorithm of machine learning algorithms, and wherein, for said each reference variant of the plurality of reference variants, a corresponding mini-ML, less costly, variant of a corresponding plurality of mini-ML variants, less costly, variants is generated, the corresponding plurality of mini-ML variants includes the new variant of the machine learning algorithm, and wherein the sequence of instructions further includes instructions, which, when executed by said one or more hardware processors, cause:

receiving a request to determine expected performances of the plurality of reference variants for a particular training data set;

for said each reference variant of the plurality of reference variants, selecting a respective mini-ML variant;

performing cross-validation of the respective mini-ML variant thereby generating a corresponding particular performance score of said each reference variant;

based on the corresponding particular performance score, determining whether said each reference variant of the plurality of reference variants, when trained by the particular training data set, yields most accuracy.

\* \* \* \* \*